(12) United States Patent
Bourilkov et al.

(10) Patent No.: US 9,762,069 B2
(45) Date of Patent: Sep. 12, 2017

(54) MULTI-USE FAST RATE CHARGING STAND

(75) Inventors: Jordan T. Bourilkov, Stamford, CT (US); George M. Cintra, Holliston, MA (US); David N. Klein, Southbury, CT (US); Leslie J. Pinnell, Framingham, MA (US); John Rotondo, Trumbull, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 2067 days.

(21) Appl. No.: 12/468,432

(22) Filed: May 19, 2009

(65) Prior Publication Data

US 2010/0295503 A1 Nov. 25, 2010

(51) Int. Cl.
*H02J 7/00* (2006.01)

(52) U.S. Cl.
CPC .......... *H02J 7/0006* (2013.01); *H02J 7/0027* (2013.01); *H02J 7/0068* (2013.01)

(58) Field of Classification Search
CPC .................................................. A61B 1/00087
USPC .................................................. 320/106, 115
See application file for complete search history.

(56) References Cited

U.S. PATENT DOCUMENTS

| 345,124 | A | | 7/1886 | De Virloy et al. |
| 4,849,682 | A | * | 7/1989 | Bauer ................ H02J 7/0004 320/106 |
| 5,539,297 | A | | 7/1996 | Fiebig |
| 5,548,200 | A | | 8/1996 | Nor et al. |
| 5,780,991 | A | * | 7/1998 | Brake et al. ................ 320/112 |
| 5,808,442 | A | | 9/1998 | Kaite et al. |
| 6,771,044 | B1 | * | 8/2004 | Vinciguerra et al. .......... 320/116 |
| 7,045,989 | B2 | * | 5/2006 | Sakakibara et al. .......... 320/106 |
| 7,816,886 | B2 | * | 10/2010 | Brandon et al. .............. 320/110 |
| 7,888,913 | B1 | * | 2/2011 | Marty et al. .................. 320/132 |
| 2005/0200332 | A1 | | 9/2005 | Kangas et al. |
| 2008/0238357 | A1 | | 10/2008 | Bourilkov et al. |
| 2008/0265836 | A1 | | 10/2008 | Inoue et al. |

FOREIGN PATENT DOCUMENTS

| DE | 198 39 174 | 3/2000 |
| EP | 0 314 155 | 5/1989 |
| JP | H01148030 A | 6/1989 |
| JP | H11285159 A | 10/1999 |

(Continued)

OTHER PUBLICATIONS

Made-In-China.com, Lead-Acid Battery Charger, http://www.made-in-china.com/china-products/productviewafREyAncjJgK/Lead-Acid-Battery-Charger.html, 2008.

(Continued)

*Primary Examiner* — Richard V Muralidar
(74) *Attorney, Agent, or Firm* — Marshall, Gerstein & Borun LLP (57) ABSTRACT

An apparatus includes a charger and a plurality of connectors such that a connector includes a switch and a connection between the charger and the connector. The charger is configured to direct a switch associated with one of the plurality of connectors to connect the connector with which it is associated to the charger. The charger is also configured to charge a device connected to the connector according to a type of battery detected in the device. A plurality of devices is charged using a prioritized charging scheme.

8 Claims, 5 Drawing Sheets

(56) References Cited

FOREIGN PATENT DOCUMENTS

JP          2008278592  A     11/2008
WO         WO 00/10239         2/2000

OTHER PUBLICATIONS

Office Action, Japanese patent application No. 2015-159830, mailing date Aug. 30, 2016.
David Linden, "Handbook of Batteries." McGraw-Hill, 2nd Ed., pp. 1.9-1.11; 7.3-7.7; 11.79-11.81; 12.1-12.16; and 23.3-23.12 (1995).
S. Uno Falk et al., "Alkaline Storage Batteries," John Wiley & Sons, Inc., pp. 1-41 (1969).
Global Sources, HCT Electric Co Ltd., Battery Charger, http://www.globalsources.com/gsol/I/Standard-battery/p/sm/1002739242.htm, Undated.
Made-In-China.com, Lead-Acid Battery Charger, http://www.made-in-china.com/china-products/product viewafREyAncjJgK/Lead-Acid-Battery-Charger.html, 2008.
Omron Product Display, S8E3 Compact, Economical, 3-point Switching Power Supply, http://omrwsc.am.omron.com/webapp/wcs/stores/servlet/ProductDisplay?catalogId=10001&storeId=10001&productId=34497&langId=-1&categoryId=16840, 2006.

* cited by examiner

MULTI-USE FAST RATE CHARGING STAND

BACKGROUND

Battery chargers typically charge one specific battery-operated device through a cable attachment or terminal connection and typically have charge times beyond one hour or so. That is, for example, a cell phone charger typically does not charge a digital camera and so forth. Such chargers also generally do not encompass a high rate charge connection or terminal allowing charge times under fifteen minutes. Recent developments in battery cells technology, including lithium-ion (Li-ion) rechargeable batteries, have made the idea of rapid battery charging in the range of minutes instead of hours a realistic expectation for consumers.

Li-ion rechargeable batteries typically are charged by a source that provides a constant current followed by a constant voltage (CC/CV) with a crossover from constant current to constant voltage at approximately 4.2V. That is, the charging operation switches from a constant current mode to a constant voltage mode when the battery's voltage reaches approximately 4.2V. The source that provides such a charging profile is controlled by an electronic feedback mechanism. Charging a rechargeable battery within a given period of time involves careful and accurate regulation of the charging device's charging mechanism. Facilitating accurate regulation of the charging current involves accurate measurement of the battery's voltage and/or current. Furthermore, because batteries have different capacities and require different levels of charging currents accurate information regarding battery capacities enables completion of the charging operation within the given period of time.

Conventional chargers rely on a mechanical or analog or digital technique to determine the type of battery being charged and thus an appropriate charge regime to apply. For example, some techniques are based on the use of an internal battery identification resistor, the value of which determines the charging parameters applied for that specific battery. Mechanical techniques have also been used, such as using the location of a connector polarity key or the location of a particular connector pin to distinguish between different battery models requiring different charging parameters. The Smart Battery Bus (SMBus) standards, for example, use a serial data communications interface to communicate the charging parameters to the charging device. The above approaches use additional connection points beyond the battery power terminals or some added mechanical feature not required for the basic battery function of delivering stored energy to a portable device. In the case of the SMBus standard, an electrical circuit and at least two additional connector pins are used to implement the smart interface between the charger and battery, adding to the cost, complexity and size of the battery.

SUMMARY

A charging stand base and fast rate charging circuitry encompasses single or multiple charge terminals so that one or more devices are attached to the charger at the same time. The charger communicates with each device attached and selects an appropriate fast charge rate per device. Charging of the one or more devices commences either simultaneously or in a serial order. The charger houses either a high rate universal or common connector such that almost any device may be attached for charging.

An apparatus includes a charger and a plurality of connectors such that a connector includes a switch and a connection between the charger and the connector. The charger is configured to direct a switch associated with one of the plurality of connectors to connect the connector with which it is associated to the charger. The charger is also configured to charge a device connected to the connector according to a type of battery detected in the device.

In one embodiment of the apparatus, the apparatus includes a plurality of devices, a device connected to a connector from the plurality of connectors, wherein the plurality of devices is charged simultaneously.

In another embodiment, the plurality of devices is charged using a prioritized charging scheme. The plurality of devices comprise a first subgroup of devices and multiple other subgroups of devices, and the first subgroup of devices has a priority over the multiple other subgroups. At least one of a plurality of devices within the first subgroup of devices are charged using a prioritized charging scheme. Alternatively, at least one of a plurality of devices within the first subgroup of devices are charged using a simultaneous charging scheme. Further, the prioritized charging scheme may be determined by a user through a user interface. Still further, the prioritized charging scheme is determined based on results of an identification of batteries associated with the plurality of devices.

In another embodiment, the plurality of devices is charged using a time-of-connect serialization.

In another embodiment, the plurality of devices is charged using a round robin serialization charging scheme.

In another embodiment, the apparatus includes a first device connected to a first connector within the plurality of connectors at a first time. The apparatus also includes a second device connected to a second connector within the plurality of connectors at a second time later than the first time. The charger directs current from the first device to the second device according to relative capacities of batteries associated with the devices.

In another embodiment, the charger within the apparatus includes a variable current source and a battery type identifier connected to the plurality of connectors. The charger also includes a controller including means for directing a switch associated with one of the plurality of connectors to connect the connector with which it is associated to the charger. The switch is directed to convey charging current from the variable current source to a device based upon a battery type identified by the battery type identifier.

DETAILED DESCRIPTION

Figure 1:
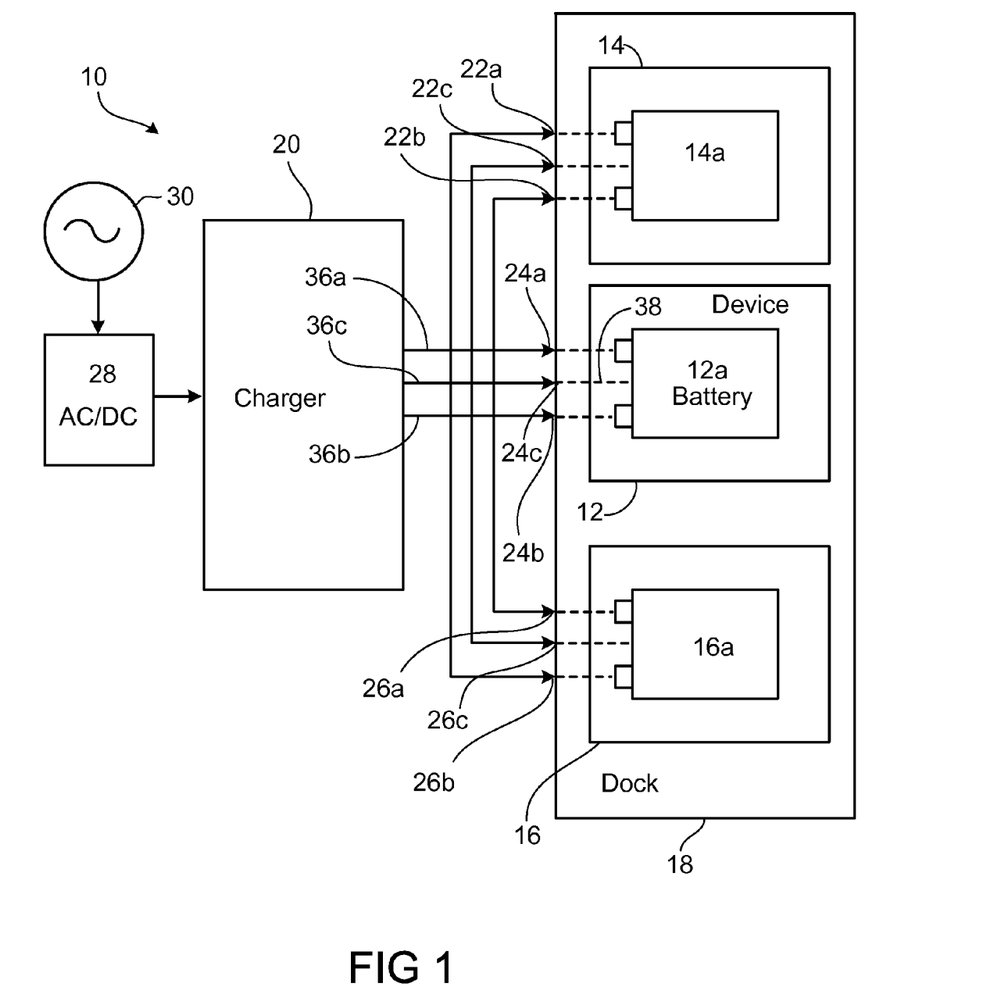
FIG. 1 is a block diagram of a charging stand.

FIG. 1 depicts an example of a multiple port charger 10. In this example, three devices 12, 14, 16, each with rechargeable batteries 12*a*, 14*a*, and 16*a*, respectively, are placed within a charging dock 18 connected to a single CC/CV charger 20. The charging dock 18 is not limited to three device connectors, and may take on more connectors. Each rechargeable battery has at least one rechargeable electrochemical cell (not pictured). Each port in the charging dock 18 has a connector and a switch (not pictured) that connects a device to the charger 20. Connectors to each device within the charging dock 18 have a positive terminal 22a, 24a, 26a, a negative terminal 22b, 24b, 26b, and a communication terminal 22c, 24c, 26c. The charger is powered via an alternating current/direct current (AC/DC) power converter 28 that is connected to an AC power source 30. The charger 20 may also be powered via a direct DC connection, e.g., a 12-volt battery. A device is connected to a port of the multiple port charger 10 via a connector. The charger 20 directs the corresponding switch to connect the charger 20 with the connector and charges the device connected to the connector according to the battery detected in the device.

The charger 20 is configured to charge batteries 12a, 14a, 16a having at least one electrochemical cell. The battery 12a can be a secondary cell (or battery). Secondary electrochemical cells can be recharged repeatedly. Secondary cells can be designed to accommodate for changes, such as swelling, that can occur in the cells. Secondary cells are described, e.g., in Falk & Salkind, "Alkaline Storage Batteries", John Wiley & Sons, Inc. 1969; and U.S. Pat. No. 345,124; all hereby incorporated by reference. In the embodiments described herein, the battery 12a is a secondary, or rechargeable, battery.

In some embodiments, the rechargeable batteries 12a, 14a, 16a include Li-Ion cells having graphitic anode material or lithium titanate anode material, and lithiated-iron-phosphate cathode materials adapted to enable fast recharge of rechargeable batteries based on such materials.

Devices 12, 14, 16 are received within a charging compartment of the multiport charging dock 18 such that charging terminals 36a and 36b electrically and mechanically couple to terminals 22a, b, 24a, b, 26a, b, respectively, of the charger dock terminal 18, and sensing terminal 36c electrically and mechanically couple to the sensing terminal 22c, respectively, of the battery 12a. In some embodiments, the terminals 22a, 22b and 22c are pins that are adapted to be connected in a mating configuration with respective terminals 36a, 36b, and 36c located within the charging compartment of the charger 20. The charger 20 determines an appropriate charging current to be applied to the battery 12a and applies that charging current through terminals 36a and 36b to the battery 12a via terminals 22a and 22b of the charging dock 18.

Figure 2:
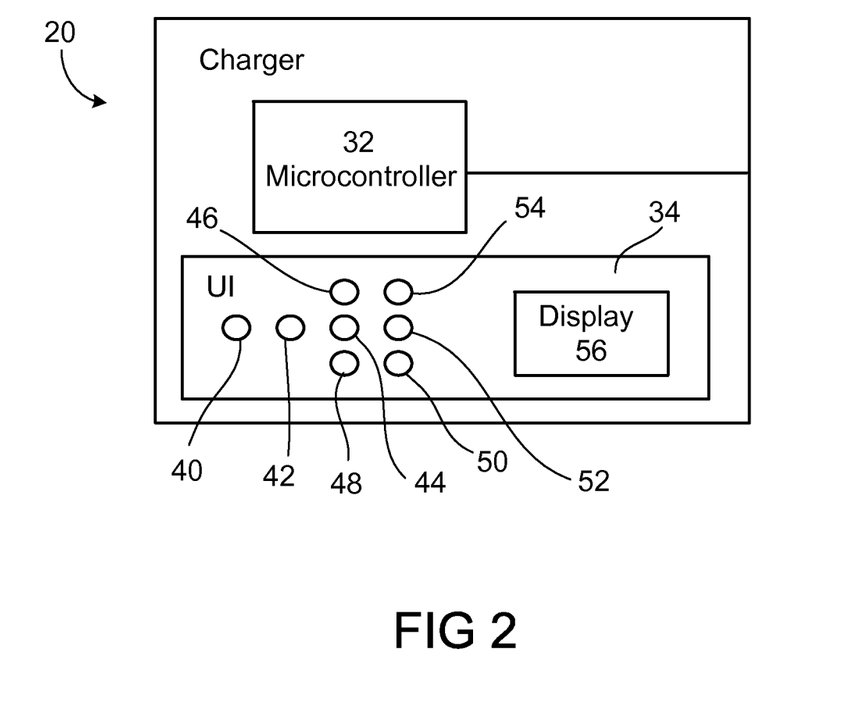
FIG. 2 is a block diagram of the charger.

Referring now to FIG. 2, the charger 20 has a microcontroller 32 and a user interface 34. The microcontroller 32 is configured to control the charging process, including regulating the voltage and/or current applied to each device 12, 14, 16. Such control of the charging process is involved so that a battery 12a, 14a, 16a is charged to its pre-determined charge level within a given time period. Further, such control is involved so that the voltage of a battery 12a, 14a, 16a within each device 12, 14, 16 does not exceed a pre-determined upper voltage limit. Finally, such control is involved so that the voltage increase rate, i.e., the rate at which the voltage at the charging terminals of each battery 12a, b, 14a, b, 16a, b increases as the charging operation progresses, conforms to specified charging profile; e.g., it increases at a particular rate for the first 1 minute of the charging operation.

The user interface 34 includes output devices, such as LEDs, that provide status information to a user regarding the charger 20 and/or each device 12, 14, 16 connected thereto. The user interface 34 includes, for example, a blue-colored LED 40, a red-colored LED 42, and yellow-colored LEDs 44, 46, and 48. The user interface 34 also includes green-colored LEDs 50, 52, 54.

The blue-colored LED 40 becomes illuminated when the charger is in operation and is connected to an external power supply, such as an AC power supply connected to the charger 20 via an AC power port 30.

The red-colored LED 42 is activated to produce a steady red illumination when a device that cannot be accommodated by the charger 20 is inserted into a charging compartment. Such a battery includes, for example, a rechargeable battery whose ID resistor 38 has a value representative of a capacity or of a battery type that the microcontroller 32 is not configured to handle. The red-colored LED 42 may also be activated to produce a blinking red illumination when a device with a defective battery is inserted into a charging compartment. For example, batteries whose initial voltage level is below, e.g., 2V, may be damaged, and thus the charger 20 does not commence the charging operation until the suspected damaged battery is removed. The red-colored LED may also be illuminated upon the detection of a fault condition that could adversely affect the operation of the charger and/or damage the charger or battery. Such fault conditions include the detection of abnormal voltage levels at the battery's terminals, overheating conditions of the battery and/or the charger (e.g., if temperatures exceeding 60° C. are detected), etc. A detailed description of exemplary procedures to detect and respond to fault conditions that transpire in the course of charging batteries is provided in patent application U.S. Ser. No. 11/776,021, entitled "Fast Battery Charger Device and Method", the content of which is hereby incorporated by reference in its entirety.

The yellow-colored LEDs 44, 46, 48 are illuminated when the charger is charging the devices 12, 14, 16 with a current of, for example, 6 A. Such a charging current could be indicative that the battery placed inside the charging compartment of the charger 20 has a capacity of 500 mAh, where "Ah" is the unit of battery capacity Ampere-hour, which at a charging current of 6 A would complete the charging operation in approximately 5 minutes.

The green-colored LEDs 50, 52, 54 are illuminated when the charger is charging the devices 12, 14, 16 with a current of, for example, 8.5 A. Such a charge current could be indicative that the battery placed inside the charging compartment of the charger 10 has a capacity of 700 mAh, which at a charging current of 8.5 A would also complete the charging operation in approximately 5 minutes.

The user interface 34 could include additional LED's that could each correspond to different conditions (e.g., different fault conditions), different battery capacities, etc. Further, the color and/or illumination scheme described herein could be modified so that different colors could correspond to different battery capacities or to different conditions.

The user interface 34 includes a display device 56 configured to provide output information to the user. For example, in situations in which a suspected damaged battery or a battery that is incompatible with the charger has been placed in the charging dock 18, the user interface would cause a message of "Defective Battery" or "Illegal Battery" to be displayed.

The user interface 34 also includes a user-input section (not shown) that could include switches, buttons and/or knobs through which a user indicates, for example, the charging period, and/or other types of parameters pertaining to the charging process. Thus, if the user desires to charge the battery at a rate other than one that would result in the battery becoming at least 90% charged within approximately 5 minutes, the user so specifies through the user-input section of the user interface 34.

Based on the identity of the battery, which is determined through an identification mechanism such as an ID resistor, by specifying the battery type and/or capacity through the user-input section, or through other battery determination schemes, the charger accesses a lookup table that indexes suitable charging current values based on the charging period and the battery identity and/or capacity. For example, computational techniques may be used to determine the appropriate charging current.

As a further example, the user-input section of the user interface 34 includes an input element that controls the distribution of current to the various devices in the multiport charging dock 18. For example, the devices may be charged simultaneously. In this case, the current is split between the devices 12, 14, 16 that are already in the charger according to the capacities of their respective batteries 12a, 14a, 16a. If new devices are added to available charging ports, then current is diverted from the charging devices to the new devices, depending upon the charging state of the devices 12, 14, 16. Because the charger is constant voltage, the devices share the output current as it is delivered to the devices.

Figure 3:
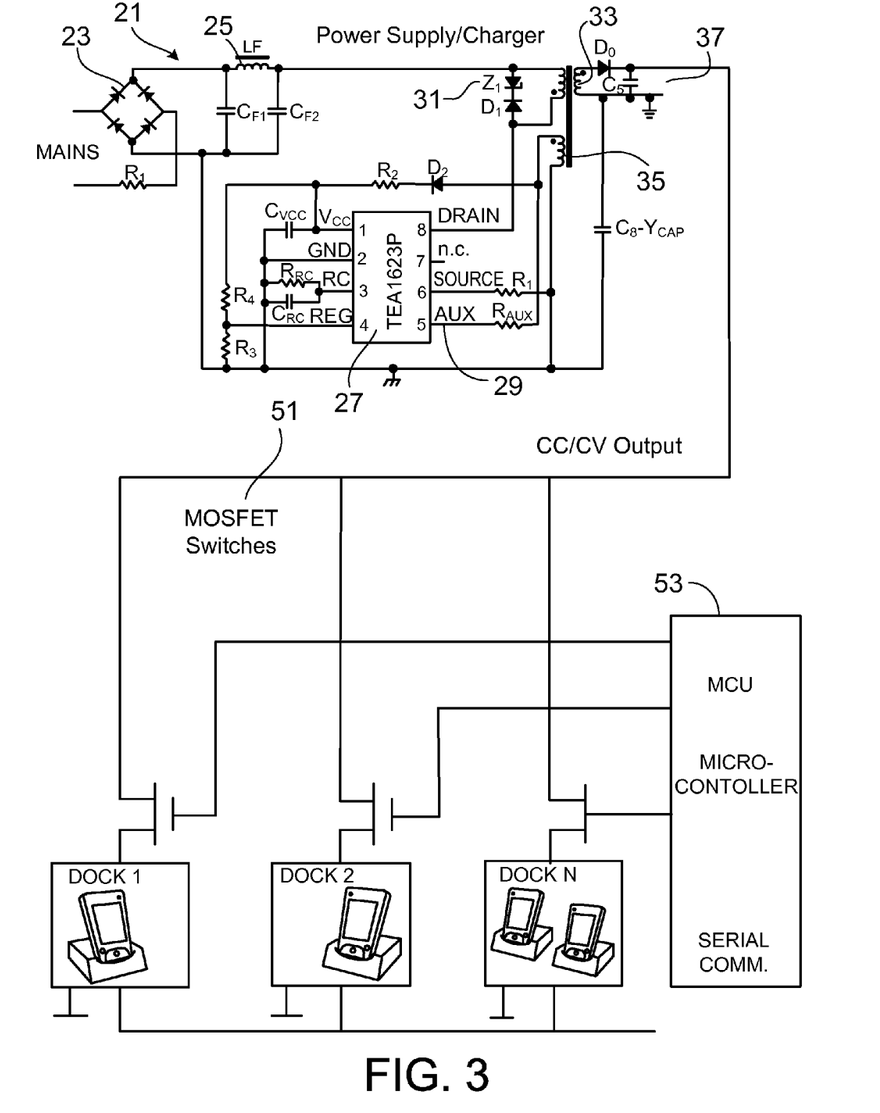
FIG. 3 is a circuit diagram of the charger showing connections to devices.

Further detail for the charger 20 is illustrated in FIG. 3. The AC/DC switch-mode power supply is configured for constant voltage (CV) and constant current (CC) output. That is, the output voltage is maintained around 4V for charging a Li-ion or similar battery directly in a device (there is no charging circuit in the device), and the output current is limited, for example to 10 A.

Charger 20 comprises a rectifier filter 21, a control integrated circuit 27, a transformer 33, an auxiliary coil 35, a Zener diode 31, and an AC to DC converter 37.

The rectifier filter 21 comprises a bridge rectifier 23 and a capacitor filter 25. The rectifier filter takes an input 120 V, 60 Hz AC signal and converts it to a 160 V DC signal.

The control IC 27 is an internal switching transistor, and chops the DC signal from the rectifier filter 21 into high-frequency pulses. The auxiliary coil 35 provides power to the control IC 27, as well as feedback to auxiliary pin 29 to help regulate to a desired output voltage. Zener diode 31 provides voltage protection for the auxiliary coil.

AC to DC converter 37 takes the voltage-regulated, high-frequency pulse output from the control IC 27 and converts it to a 3-5 V DC, constant-current signal.

Initially, the charge is off because all the MOSFET (metal-oxide-semiconductor field effect transistor) switches 51 are "off" as dictated by the MCU (micro-controller unit) 53. Upon successful identification of a device, inserted in one of the docks, via the serial communications, and following the pre-programmed algorithm setting the charge sequence priorities, the MCU 53 turns "on" one of the MOSFETs 51 to enable charge of this device.

Ideally, the MCU 53 should have a feedback to the charger to set the appropriate charging current. As shown, the charging current is limited by the power supply itself to a safe value for any legal device to be charged.

When any device completes charge, usually in 5 min. or less, it provides a message to the MCU 53 to switch this device's MOSFET 51 off and turn the next device's MOSFET on. Alternatively, this process can be based on the elapsed time (unconditional termination in 5 min.) instead, in order to simplify the communications. This process provides extra safety by guaranteeing timely charge termination.

Charging more than one device in parallel is possible, but the charging current will be shared and the charge time will be correspondingly longer. Also, the distribution of the charging current depends on the state of charge and battery impedance of the separate devices and cannot be guaranteed.

Figure 4:
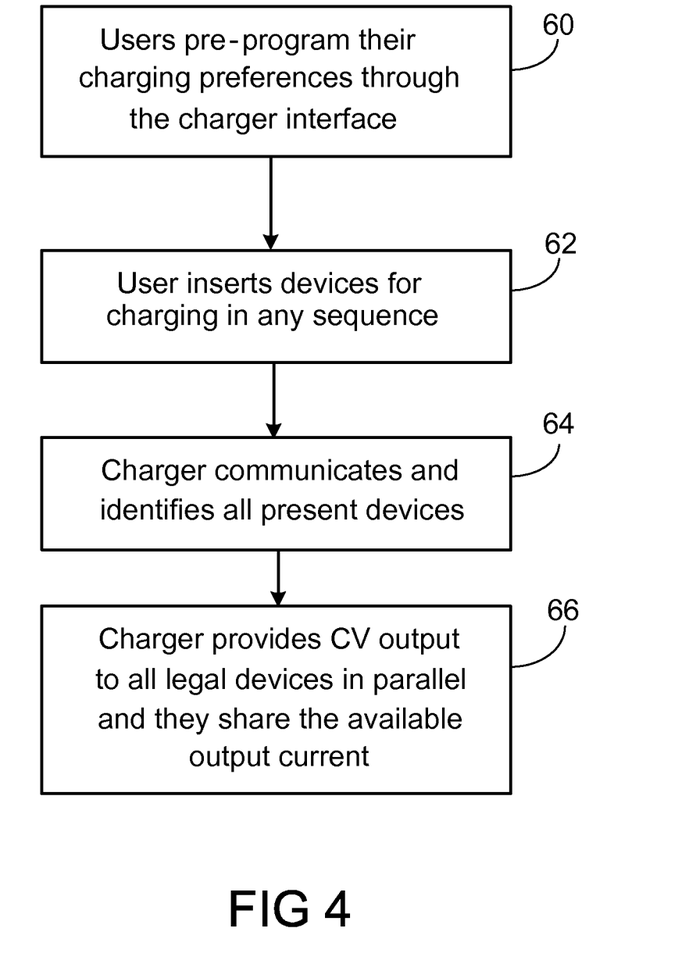
FIG. 4 is a flow chart describing a prioritized charging process.

A simultaneous charging process is illustrated in FIG. 4. Users can optionally program 60 any charging preferences through the user interface 34. Examples of charging preferences includes a preferred charging time and maximum number of devices to be charged. The user inserts 62 devices for charging in any convenient sequence. After a device has been inserted, the charger communicates 64 and identifies a device. The identification process includes measuring the resistance of ID resistors coupled to the multiport charging dock communication terminal as described previously. After a device has been identified and has been deemed compatible, the charger provides constant voltage current to the device. The device shares the available output current according to the capacities of its associated battery.

The user adds further devices to the charger after charging has commenced for other devices. The charger communicates 64 and identifies the other devices and identification proceeds as previously described.

As a further example, the devices are charged one at a time, optionally according to a specified priority that the user defines. Such a charging scheme has the advantage being able to charge selected devices before others as needed.

Optionally, the user programs the charger through the user-input section of the user interface 34 to select the order in which the charging ports get charged. The programming is done through, e.g., a user interface or a text editor. The programming may further be in a common scripting language, e.g. VBScript, JavaScript, or Perl.

Optionally, the charger automatically sets the charging priority based upon the device identifier as communicated to the charger via the communication terminals of the multiport charging dock. Such a setting of the charging priority may be done, e.g., through the programming interface.

Optionally, groups of devices are prioritized over other devices or groups of devices. Such a setting of the charging priority may be done, e.g., through the programming interface.

Figure 5:
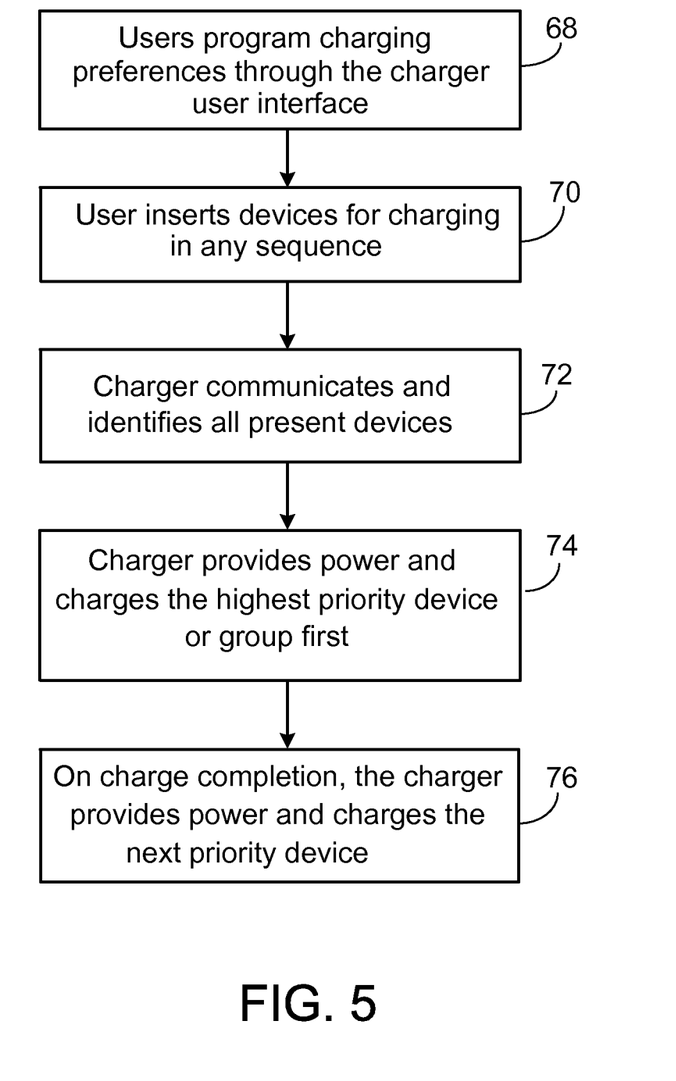
FIG. 5 is a flow chart describing a simultaneous charging process.

An example of a one-at-a-time charging process is illustrated in FIG. 5. Users program 68 any charging preferences through the user interface 34. Examples of charging preferences include a preferred charging time, maximum number of devices to be charged, and method of prioritizing device charging. The user inserts 70 devices for charging in any convenient sequence. Once the devices have been inserted, the charger communicates 72 and identifies all present devices. The identification process includes measuring the resistance of ID resistors coupled to the multi-port charging dock communication terminal as described previously. The charger provides power to and charges 74 the highest priority device or group of devices first. Note that, within a group, the user may use either the simultaneous or prioritized charging schemes. Finally, on completion of the charging of the prioritized device or group, the charger provides power to and charges 76 the next priority device. This procedure continues until all devices have been charged.

Other charging schemes include, e.g., those serialized by time of connect and those using a round robin scheme.

To any of the charging schemes described above, the charger includes a circuit to identify battery characteristics. The following discussion refers to the device 12 as representative of all devices 12, 14, 16 to be connected to the charger 20.

To perform adjustments to the voltage and/or current applied to the battery 12a, measurements of the voltage at the terminals of the charging dock 22a, 22b is performed. To reduce the effect of voltage measurement inaccuracies, the charging dock 18 uses one set of terminals 22a, 22b connected to each battery 12a to apply the charging current. A separate dedicated terminal 22c is used to determine the battery capacity and/or other pertinent information regarding the battery 12a. Specifically, the charger 20 includes a battery identification read mechanism that includes an ID sensing terminal 36c. The identification (ID) sensing terminal 36c is configured to be mechanically and electrically coupled to an identification mechanism of the battery 12a. The identification mechanism is configured to provide the charger 10 with identification information representative of the battery's capacity, type, model, and/or other data relevant to the charging operation to be performed on the battery 12a. The microcontroller 32 is configured to communicate with the battery identification mechanism and to receive the identification information. Based on the identification information received from the battery 12a, the microcontroller 32 determines the charging current to apply to the battery 12a.

One such example of a battery identification mechanism is a battery ID resistor 38 that has a resistance value representative of the corresponding battery capacity, type, and/or model of the battery 12a. The ID resistor 38 may be disposed in the interior of the casing of the battery 12a, or it may be disposed on the exterior of the battery 12a. In the example shown in FIG. 1, the ID resistor 38 is electrically coupled to a dedicated battery ID terminal 22c which is adapted to be mechanically and electrically coupled to the terminal 36c of the charger 20.

The ID resistor 38 is electrically coupled to the power terminal 22a, 22b and the sensing terminal 22c of the charging dock 18. To obtain information representative of the battery's capacity and/or identity, a pre-determined test current, Itest, is applied by the charger 20 to the ID resistor 38 via the ID terminal 36. A voltage drop VR1 across the ID resistor 38 is measured using a voltage sensor of the charger 20 coupled to the terminal 36. The measured voltage drop at the ID resistor 38 is communicated to the microcontroller 32, which uses the measured voltage to compute the resistance of the ID resistor 38 according to R1=VR1/Itest.

The computed resistance R1 corresponding to the ID resistor 38 is used as an index or address to access a lookup table that holds, for each of a plurality of different resistance values associated data. Such data includes the respective battery capacities associated with the resistance values, permissible charge current values to apply to the battery, and/or other information that is relevant to the charging process. Alternatively, the measured voltage VR1 is used to access the lookup table.

In some embodiments, the ID resistor 38 is a thermistor whose resistance varies with changing temperature. Such a thermistor both identifies the type of battery to be charged and monitors the battery's temperature. The charger 20 determines the temperature of the battery based on the variations in the resistance of the thermistor. For example, determination of the temperature of the battery is performed by measuring the voltage at the thermistor resulting from applying a current of some pre-determined level, and matching the measured voltage, or the resistance computed based on the measured voltage and applied current, to a lookup table that relates, for a particular battery capacity or type, the measured value to a corresponding temperature. When the temperature of the battery reaches a level deemed to be unsafe, the charger 20, based on the determined temperature, either lowers or terminates the charging current to cause the battery's temperature to decrease. Optionally, the charger 20 is implemented without thermal control and/or thermal monitoring mechanisms and in such cases, a determination of the temperatures of the battery and/or the charger, and a response thereto, are not performed.

Other types of battery identification mechanisms include Radio Frequency Identification (RFID) mechanisms in which an electrical signal representative of the battery's capacity, type, state of the battery's charge/health, etc, is communicated to the microcontroller 32 in response to an activation signal (e.g., a radio signal). Other suitable identification mechanisms include mechanisms that implement serial communication techniques to identify the battery, e.g., the SMBus standards, to cause identification data representative of the battery's capacity and/or type to be communicated to the microcontroller 32 via a serial data communication interface. In some embodiments, determination of the charging current is performed by measuring at least one of the battery's electric characteristics indicative of the capacity and/or type of battery (e.g., the battery's DC charging resistance or AC Impedance.) A detailed description of a charger device that adaptively determines the charging current based on measured characteristics of the battery is provided in U.S. patent application U.S. Ser. No. 11/775,987, entitled "Adaptive Charger Device and Method", the content of which is hereby incorporated by reference in its entirety.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a plurality of connectors within a multiport charging dock, wherein each connector is configured to receive a device including a rechargeable battery;
   a charger, coupled to the plurality of connectors, to charge the battery of each device connected to one of the plurality of connectors according to a battery type detected in each of the devices;
   a plurality of switches, wherein the plurality of switches are coupled to the plurality of connectors to electrically couple the plurality of connectors to the charger; and
   circuitry (i) to control switching of the plurality of switches coupled to the plurality of connectors, (ii) to connect the plurality of connectors to the charger, and (iii) to permit charging current to flow from a variable current source to each device connected to one of the plurality of connectors based upon the battery type identified by a battery type identifier;
   wherein the charger charges a plurality of devices using first and second prioritized charging schemes when the plurality of devices are connected to the plurality of connectors,
   wherein the first prioritized charging scheme charges batteries in devices in a first subgroup of the plurality of devices over multiple other subgroups of the plurality of devices, and
   wherein the second prioritized charging scheme is used to charge batteries in devices within the first subgroup of the plurality of devices.

2. The apparatus of claim 1, wherein the charger charges the plurality of devices simultaneously when the plurality of devices are connected to respective connectors of the plurality of connectors.

3. The apparatus of claim 1, wherein the charger charges devices within the first subgroup simultaneously.

4. The apparatus of claim 1, further comprising a user interface for receiving instructions from a user defining the first and the second prioritized charging schemes.

5. The apparatus of claim 4, wherein when a first device is connected to a first connector of the plurality of connectors at a first time, and a second device is connected to a second connector of the plurality of connectors at a second time later than the first time, the charger diverts current from the first device to the second device according to relative capacities of batteries associated with the first and the second devices.

6. The apparatus of claim 1, wherein the charger receives results of an identification of batteries coupled to the plurality of devices and determines one of the first or second prioritized charging schemes using the results.

7. The apparatus of claim 1, wherein the charger charges the plurality of devices serially according to an order in which the plurality of devices are connected to respective connectors of the plurality of connectors.

8. The apparatus of claim 1, wherein the charger charges devices according to an ordering of the connectors.

* * * * *